(No Model.)

J. F. E. FELTNER.
HOSE COUPLING.

No. 554,666.

Patented Feb. 18, 1896.

Witnesses
Jos. C. Stack

Inventor
John F. E. Feltner.

By his Attorneys,
C. A. Snow & Co.

200
UNITED STATES PATENT OFFICE.

JOHN FRANS ELOF FELTNER, OF LEADVILLE, COLORADO.

HOSE-COUPLING.

SPECIFICATION forming part of Letters Patent No. 554,666, dated February 18, 1896.

Application filed December 27, 1894. Serial No. 533,099. (No model.)

*To all whom it may concern:*

Be it known that I, JOHN FRANS ELOF FELTNER, a citizen of the United States, residing at Leadville, in the county of Lake and State of Colorado, have invented a new and useful Hose-Coupling, of which the following is a specification.

My invention relates to hose-couplings, and has for its object to provide simple and improved means for attaching the members of the coupling to the extremities of the hose-sections, whereby accidental detachment and leakage are prevented, said members being adapted to be united with facility and rapidity to form a water-tight joint.

Further objects and advantages of the invention will appear in the following description, and the novel features thereof will be particularly pointed out in the appended claims.

Figure 1:
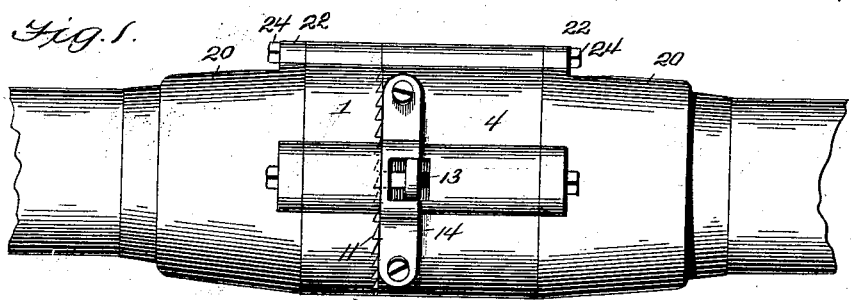
Figure 2:
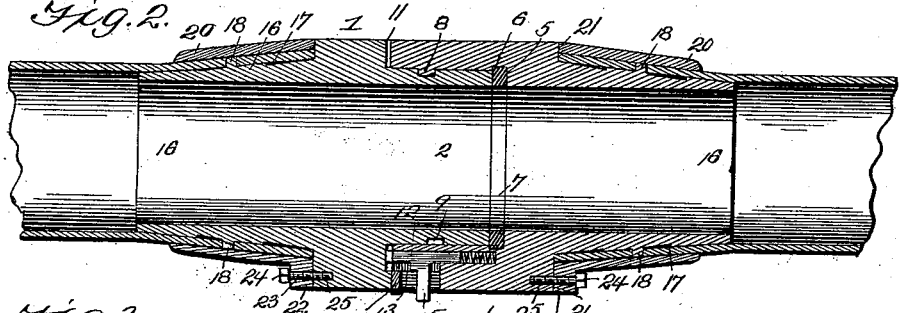
Figure 3:
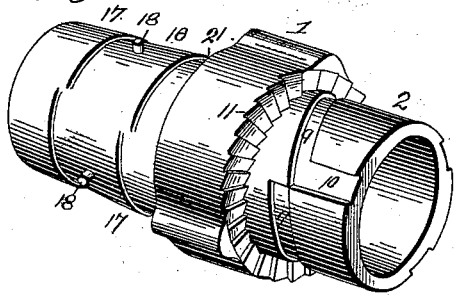
Figure 4:
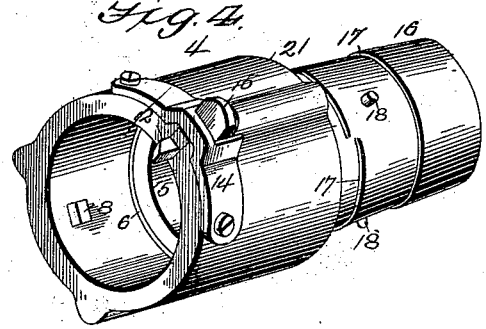
Figure 5:
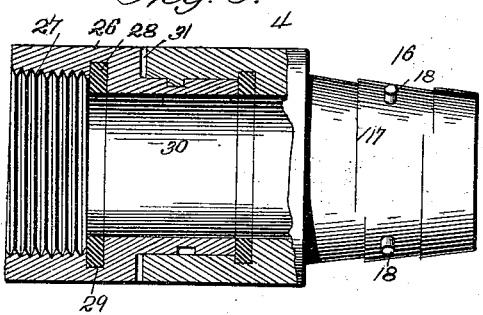
Figure 6:
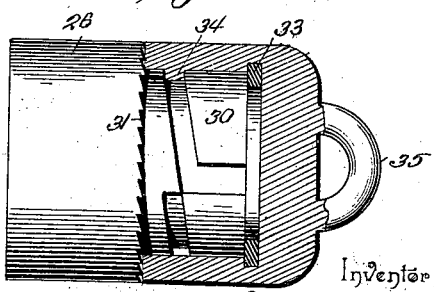

In the drawings, Figure 1 is a view of the coupling constructed in accordance with my invention. Fig. 2 is a longitudinal central section of the same. Fig. 3 is a detail view in perspective of the male member of the coupling detached. Fig. 4 is a similar view of the female member of the coupling. Fig. 5 is a longitudinal section of a slightly-modified form of the device, the male member of which is adapted for attachment to a faucet, pump-spout, or other device for supplying water. Fig. 6 is a similar view showing a cap or stopper applied to the male member of the coupling, which is shown in Fig. 5.

Similar numerals of reference indicate corresponding parts in all the figures of the drawings.

The male member 1 of the coupling is provided with a reduced tubular projection 2, which is adapted to be received by the cavity 3 of the female member 4, said cavity terminating at a shoulder 5, contiguous to which the member is counterbored, as shown at 6. In this counterbore and resting upon the shoulder 5 is a compressible packing-ring 7, against which the extremity of the tubular portion 2 bears when the members of the coupling are united. The female member is provided with interior studs 8 to engage spirally-disposed grooves 9 formed in the exterior surface of the projection 2, longitudinal branch grooves 10 being provided to communicate with said spirally-disposed grooves and extending to the extremity of the projection, whereby the members of the coupling may be moved longitudinally toward each other when the studs of the female member have been aligned with the branch grooves 10 of the male members. After the members have been moved toward each other sufficiently to bring the studs in alignment with the spiral grooves the members should be turned in relatively opposite directions to force the extremity of the projection of the male member firmly against the packing-ring of the female member.

Contiguous to the projection 2 is a toothed or ratchet shoulder 11, and mounted upon the female member is a spring-actuated locking-bolt 12, the extremity of which projects beyond the end of the member to engage the teeth on said shoulder when the parts have been brought into operative position. The teeth or notches of the shoulder are arranged in such a position as to allow the members to be turned to the right or in the direction of turning a right-hand screw to place without obstruction, but which prevent backward rotation of the parts. This bolt is arranged in a guide 13 formed in the member and is projected exteriorly by a keeper 14, a finger-hold 15 being attached to or integral with the bolt and extending outward through an opening in the keeper within the reach of the thumb of the hand which grasps the female member, whereby when it is required to detach the members the locking-bolt may be held out of engagement with the toothed shoulder during the backward or left-hand rotation of the parts.

The means for securing the members to the sections of hose is the same for both parts, each member being provided with an exteriorly tapered or conical barrel 16 provided with surface grooves or indentations 17 to roughen the surface and cause frictional contact between the inner surface of the hose-section and the outer surface of the barrel and exterior radial pins 18, which are adapted to project through perforations 19 formed for that purpose in the hose-section. Over this conical barrel and of sufficiently larger diameter than the same is an interiorly-tapered or conical sleeve 20, adapted to fit at its inner edge against the shoulder 21 at the outer end of the body portion of the member and provided with lateral ears 22 having openings 23, through which extend screws 24 to engage threaded sockets 25 in the body portion of the member.

To attach a member of the coupling to the extremity of a hose-section, the latter is perforated as described to receive the pins 18, after which the conical barrel is inserted in the end of the section until the extremity thereof bears against the shoulder 21, the parts being arranged to cause the pins 18 to engage the perforations in the hose, after which the sleeve 20, which has previously been slipped over the hose-section is brought toward the coupling and is crowded over the distended end of the hose until its inner end is in contact with the said shoulder 21. The screws are then introduced to secure the sleeve in place.

To assemble the members of the coupling they are disposed in coaxial alignment with the interior studs of the female member opposite the longitudinal branch grooves of the male member, and after said studs have been inserted to the bottoms of the branch grooves the members are turned in opposite directions until the desired tightness has been secured, backward rotation being prevented by the engagement of the locking-bolt with the toothed shoulder of the male member.

In the modified form of my invention which I have shown in Figs. 4 and 5 the male member 26 is provided with interior threads 27 to engage a spout or other permanent means for supplying water, a packing-ring 28 is fitted in a counterbore 29 thereof, and the projection 30 is constructed as hereinbefore described in connection with the male member of the form of my invention, which is shown in Figs. 1, 2 and 3. The shoulder 31 at the extremity of said projection is toothed to be engaged by a locking-bolt on the female member which is united therewith. The cap 32, which is shown in Fig. 6, is provided with an interior packing-ring 33 and interior studs 34 to engage the grooves in the outer surface of the projection of the male member, said cap having a ring or loop 35, to which a chain may be attached to secure the cap loosely to the spout to which is attached the male member of my improved coupling.

The scoring of the surfaces of the conical barrels of the members of the couplings is preferably formed by partial or sectional circumferential grooves, said scoring forming a suitable seat for the inner surfaces of the hose-sections fitted on the barrel.

Various changes in the form, proportion, and the minor details of construction may be resorted to without departing from the spirit or sacrificing any of the advantages of this invention.

Having described my invention, I claim—

1. A hose-coupling having interlocking detachable members of which each member is provided with an exteriorly-tapered barrel to fit in the extremity of a hose-section, the surface of said barrel being scored to form partial or sectional circumferential grooves and having projecting pins to engage punctures in the hose-section, a sleeve fitting exteriorly over the extremity of the hose-section to hold the latter in contact with the surface of the barrel, and means for securing the sleeve to the body portion of the member, substantially as specified.

2. A member of a hose-coupling, having an exteriorly-tapered or conical barrel provided with a roughened exterior surface and spaced pins to fit in perforations of a hose-section, an interiorly-tapered sleeve adapted to fit exteriorly over the extremity of the hose-section with its inner end in contact with a shoulder at the corresponding end of the barrel, said shoulder being the outer end of the body portion of the member, and screws arranged in perforated ears on the sleeve and engaging threaded sockets in the body portion of the member, substantially as specified.

In testimony that I claim the foregoing as my own I have hereto affixed my signature in the presence of two witnesses.

JOHN FRANS ELOF FELTNER.

Witnesses:
JOHN MONSON,
CH. STROM.